United States Patent [19]

Miller

[11] Patent Number: 5,799,304

[45] Date of Patent: Aug. 25, 1998

[54] INFORMATION EVALUATION

[75] Inventor: John David Miller, Beaverton, Oreg.

[73] Assignee: Intel Corporation, Santa Clara, Calif.

[21] Appl. No.: 956,091

[22] Filed: Oct. 23, 1997

Related U.S. Application Data

[63] Continuation of Ser. No. 367,991, Jan. 3, 1995, abandoned.

[51] Int. Cl.⁶ ............................................. G06F 17/30
[52] U.S. Cl. ............................. 707/7; 707/3; 707/201; 707/500
[58] Field of Search .................. 707/3, 7, 201, 707/500

[56] References Cited

U.S. PATENT DOCUMENTS

| | | | |
|---|---|---|---|
| 5,530,852 | 6/1996 | Meske, Jr. et al. | 395/600 |
| 5,537,586 | 7/1996 | Amram et al. | 395/600 |
| 5,600,831 | 2/1997 | Levy et al. | 395/602 |
| 5,615,325 | 3/1997 | Peden | 395/326 |

OTHER PUBLICATIONS

Beerud Sheth & Pattie Maes, "Evolving Agents For Personalized Information Filtering", Proceeding of the Ninth IEEE Conference on Artificial Intelligence for Applications, Dec. 1993.

Paul E. Baclace, "Personal Information Intake Filtering", Bellcore Information Filtering Workshop, Apr. 26, 1993.

*Primary Examiner*—Thomas G. Black
*Assistant Examiner*—Cheryl Lewis
*Attorney, Agent, or Firm*—Blakely, Sokoloff, Taylor & Zafman

[57] ABSTRACT

An automatic method and apparatus for processing information. Features in the information are recognized and occurrences of user-relevant features in the features of the information are determined. Based upon the occurrences of user-relevant features, evaluation values for portions of the information are determined based on a sum of the occurrences of the user-relevant features in each of the portions of the information. The evaluation values are then used to process the portions of the information. The processing may include an automatic recording process, squelch control, sorting process, display by evaluation value or other mechanisms.

16 Claims, 19 Drawing Sheets

| Date | | Category | eValue | NrAgents | U-Rate | Title | Key |
|---|---|---|---|---|---|---|---|
| 11/28/94 | 11:59:00 AM | Business News | 100 | 4 | + | AP Financial At 11:40 pm EST | 16350 |
| 11/29/94 | 10:55:00 AM | Business News | 100 | 10 | 0 | Pilots Challenge FAA Rule | 16131 |
| 11/29/94 | 10:33:00 PM | Business News | 99 | 3 | | Spanish Airline Workers Strike | 16200 |
| 11/29/94 | 05:12:00 PM | Business News | 98 | 7 | | AP Financial News at 6 pm EST | 16220 |
| 11/29/94 | 08:07:00 PM | Business News | 96 | 12 | | AP Financial News at 8 pm EST | 16267 |
| 11/29/94 | 08:55:00 PM | Business News | 96 | 13 | | Strike Delays Qantas Flights | 16183 |
| 11/29/94 | 09:16:00 PM | Business News | 93 | 4 | | Bond Prices Drop | 16185 |
| 11/29/94 | 10:08:00 PM | Business News | 79 | 23 | | Christmas Season Begins | 16348 |
| 11/29/94 | 10:26:00 PM | Business News | 77 | 10 | + | Greenspan Resigns in Disgrace | 16456 |
| 11/29/94 | 10:45:00 PM | Business News | 77 | 4 | + | Report: Men Sue Jenny Craig | 16153 |
| 11/29/94 | 10:26:00 PM | Business News | 73 | 13 | | Microsoft Acquires Church | 16459 |
| 11/30/94 | 00:05:00 AM | Business News | 65 | 7 | | Suit Fights FAA's Retirement Age | 16789 |
| 11/30/94 | 01:34:00 AM | Business News | 52 | 24 | | Clinton Winner at Hog Wrestling | 17854 |
| 11/30/94 | 01:54:00 AM | Business News | 43 | 12 | - | Mondale & Kirkpatrick to Web | 17894 |
| 11/30/94 | 02:03:00 AM | Business News | 37 | 8 | | Pres. Cat Missing - FBI Searching | 18654 |
| 11/30/94 | 02:18:00 AM | Business News | 22 | 13 | + | AOL to buy Networking Company | 18741 |
| 11/30/94 | 02:33:00 AM | Business News | 22 | 6 | | Santa Investigated by Labor Dept. | 18548 |
| 11/30/94 | 02:44:00 AM | Business News | 10 | 3 | | The Lighter Side of Business | 16074 |
| 11/30/94 | 02:56:00 AM | Business News | 0 | 1 | + | Elvis to buy Burger King Franchise | 17866 |
| 11/30/94 | 03:04:00 AM | Business News | 0 | 1 | | First Lady Makes Plea for Cat's Ret.. | 18965 |

FIG. 13

INFORMATION EVALUATION

This is a continuation of application Ser. No. 08/367,991, filed Jan. 3, 1995, abandoned.

BACKGROUND OF THE INVENTION

1. Field of the Invention

The present invention relates to information retrieval and processing. Specifically, the present invention relates to a method and apparatus for processing information which scans information, determines "agents" who match the information, generates values indicating the relevance of portions of that information to a user, and, based upon the values determined, presents portions of the information which is most relevant to a user.

2. Background Information

As computer networks and other information resources proliferate, the amount of information available to users also increases greatly. As the amount of information increases, the task of filtering that information to provide useful information to a user, based upon user needs and/or interests, increases beyond practically available solutions. Currently, users who subscribe to services such as CompuServe, America Online, or other on-line services, or those who subscribe to the USENET newsgroups on the Internet are often required to manually filter such information in order to determine that information which is of interest to the user. Typically, this process involves manual scanning of subject-oriented news areas, and the manual scanning of subject headings for individual messages or threads in each of those areas, and the viewing of individual articles themselves. Frequently, once an examination of an article has taken place, at least on a superficial level, the user can determine whether the article is relevant or otherwise of interest to the user. Of course, substantial band-width and time is consumed by such a process and, frequently, even those messages or threads which appear to be of interest to a user do not present any useful or interesting information to the user. Thus, a substantial amount of time is spent scanning through relevant subject areas, and then scanning individual subject headings, and, finally, reading portions of the articles themselves in order to determine whether any information contained in the articles or threads is of interest to the user.

Other techniques for information retrieval also exist. For example, using services such as the Lexis/Nexis service available from Mead Data Central, techniques such as keywords and/or full-text retrieval techniques may be used. The user may input those keywords or search-phrases which are of interest to the user and perform searches in a wide number of on-line available information resources such as case law libraries, patent law libraries, news article libraries, or other information resources. Of course, other limitations may be placed on such search queries such as subject areas, titles, authors, data ranges, etc., and field-specific search terms, and/or wild-cards are available using such services. In addition, Boolean expressions may also be used during the formulation of such queries in order to further target these searches. Even with queries which are very specific and targeted, sometimes information may be missed by the user, and also, sometimes according to the specificity of the query, sometimes too much information is retrieved. A need for more sophisticated techniques for information retrieval has thus arisen as a result of the vast volumes of information which have become available in computer form, and further, the shortcomings of certain prior art systems.

More sophisticated techniques for information retrieval have been recently developed which address some of these deficiencies of the prior art. Some of these include the creation of agents which are each responsive to different characteristics of the information which then bid upon individual portions of the information (e.g., articles). A value is generated which is representative of the relevance of that article or piece of information to the user. Other techniques include genetic algorithms which require large numbers of such agents which are used to form relevance values about individual portions of information. These prior art techniques suffer from the main deficiencies that they are large, unwieldy, and consume large amounts of processor bandwidth, and are awkward and cumbersome to maintain. Further, some of these algorithms are not as sensitive as they should be to user relevance feedback.

Thus, the prior art of information retrieval suffers from several deficiencies.

SUMMARY OF THE INVENTION

An automatic method and apparatus for processing information. Features in the information are recognized and occurrences of user-relevant features in the features of the information are determined. Features are "relevant" if they are useful in distinguishing stories from one another, particularly if such distinctions can be used to determine whether or not the user will be interested in seeing a given story. Based upon the occurrences of user-relevant features, evaluation values for portions of the information are determined based on a sum of the occurrences of the user-relevant features in each of the portions of the information. The evaluation values are then used to process the portions of the information. The processing may include an automatic recording process, squelch control, sorting process, display by evaluation value or other mechanisms.

In implemented embodiments, the determining of evaluation values for portions of the information includes allowing agents representing the user-relevant features to vote on the portions of the information. It further may include subtracting votes from the votes for each of the portions of the information to determine a difference, and dividing the difference by a number of the votes for each of the portions and against each of the portions of the information. Agents otherwise voting against an article may reverse polarity, that is, voting for the article if one of the user-relevant features occurs in the information more than an average number of times. The voting may also include allowing voting for certain of the agents which are statistically reliable. In this way, information processing itself may be made more reliable, because those agents which have not performed well in previous sessions can be prevented from voting in a current session.

BRIEF DESCRIPTION OF THE DRAWINGS

The present invention is illustrated by way of example and not limitation in the figures of the accompanying in which like references indicate like elements and in which:

FIG. 13 shows an example of a list-browser user-interface which may be used for allowing a user to provide feedback and for displaying information to the user of evaluated information.

DETAILED DESCRIPTION

Figure 1:
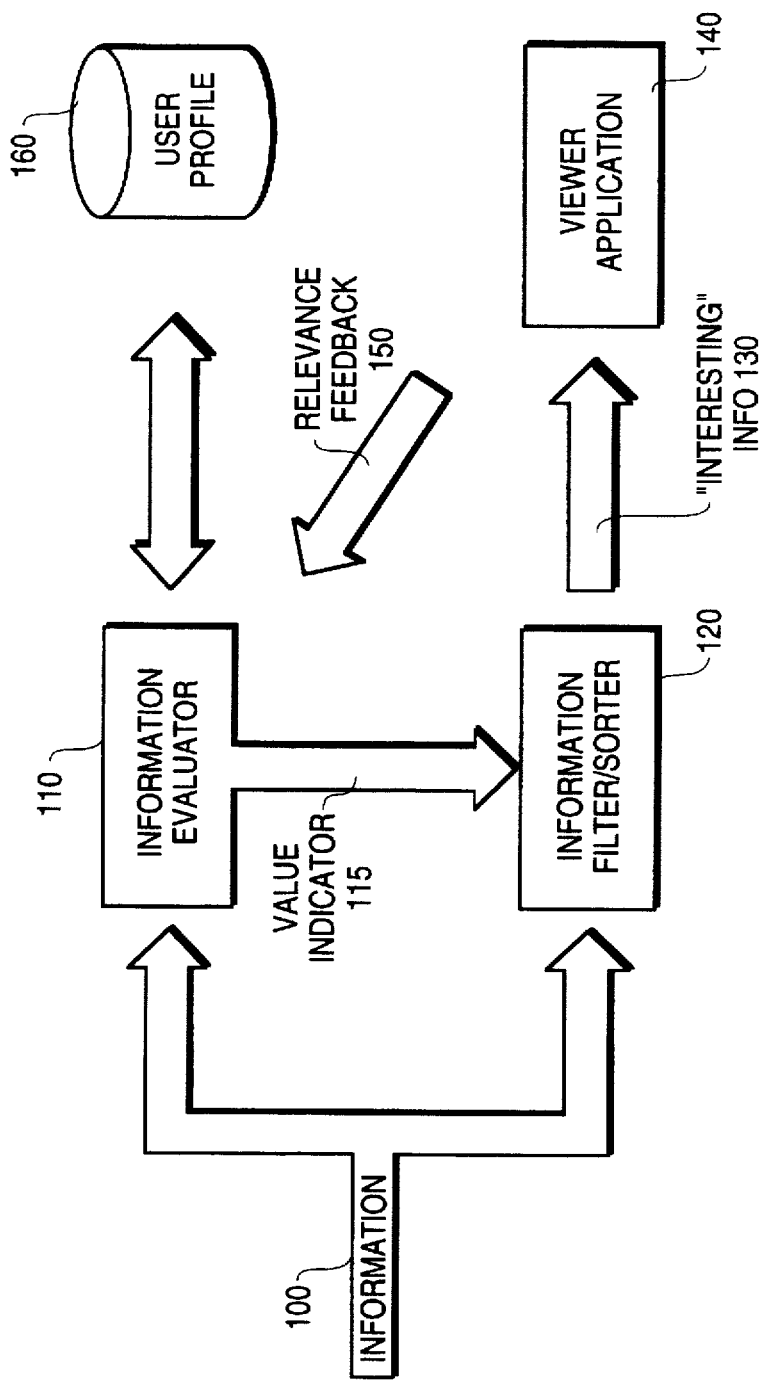
FIG. 1 illustrates an information flow as may occur in a typical system employing an information evaluator.

Implemented embodiments of the present invention include a system which evaluates information, and assigns a value (known as an evaluation value) which can then be used during post-processing for displaying and/or filtering information which is of interest to a particular user. Although the present invention will be described with reference to certain specific embodiments thereof, including data structures, objects, processes, etc. . . . , it can be appreciated by one skilled in the art that these specific details are disclosed herein are for a complete understanding of the present invention, and do not limit its scope. It can be appreciated by one skilled in the art that many departures and other modifications of the implemented embodiments of the present invention may be performed by one skilled in the art, in that this invention can be practiced without these specific details.

The information flow in an implementation of the information evaluator is discussed with reference to FIG. 1. For example, unprocessed information 100 is input to two processes 110 and 120 for evaluation and filtering of the information. This information 100 may include, but not be limited to, any number of unprocessed information sources available, such as newsfeeds, USENET newsgroups, or any other type of information which may be available in computer-readable form. Also, audio, video, and graphic information which may be decoded using any prior art means may be used. In this example, the information includes textual information, however numeric information, binary information, or other types of information (audio, video, closed-captioned programming, etc. . . . ) may be used in various embodiments of the present invention. This information 100 is input to a first process 110 which evaluates the information and, based upon certain characteristics of the information, generates an evaluation value (abbreviated, eValue), which can then be input to a second process 120 which allows additional processing of the information. Based upon this eValue, the process 120 may have a preset value specified by a user which then allows the filtering of information which does not reach a certain threshold value. Thus, process 120 may act as a filter wherein any information which does not approach the specified threshold evaluation value is not then passed to the viewer application 140. The information filter/sorter 120 then can pass the processed information 130 in a variety of ways, including, but not limited to, displaying the information in order according to the eValue, filtering out information which is assigned an eValue which does not reach the threshold value or other post-processing. This interesting information 130 can then be presented to a viewer application 140 which can allow the user to view and/or read the information which has been filtered by process 120. Depending upon user feedback, such as the reading of articles, selection of an icon indicating whether the information was "interesting," "not interesting," or the user was "neutral" on the subject matter contained within the information, relevance feedback 150 may be fed back to information evaluator 110 for further processing of additional information as it is received in information stream 100. This information may be stored in a user profile 160 for use at a later time.

Figure 2:
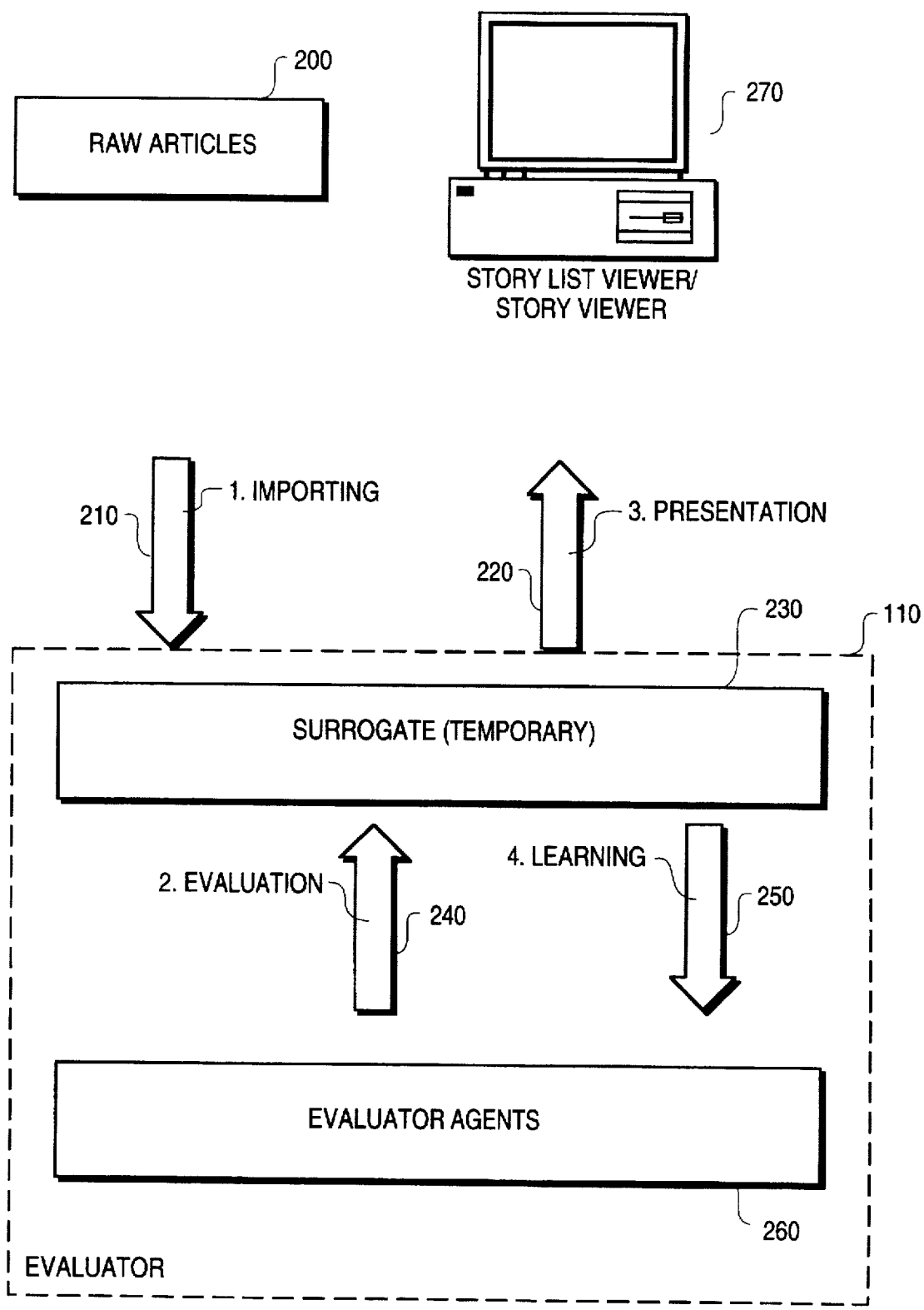
FIG. 2 shows data flow through an information evaluator in implemented embodiments of the present invention.

One implementation of a system employing that shown in FIG. 1 is shown in FIG. 2. In this implementation, the information 100 may be input in the form of articles, such as USENet news articles, raw newsfeeds, or other information, 200 which is then imported 210 into a surrogate, or other temporary storage location for the session 230 contained within evaluator 110. The surrogate 230 may then be used by evaluator 110 to perform evaluation upon learning 250 from the surrogate, and agents 260 which are created from the surrogate 230 during the course of various sessions. A user profile 160 is stored from session to session, in a non-volatile storage medium such as a hard-disk drive, which includes agents 260. Evaluation 240 generated by agents 260 can also be stored into the surrogate 230 for later use of the generated eValues, and other mapping to the features contained within the surrogate for presentation 220 to a user, via a computer display 270 or other display and feedback means as are well known to those skilled in the art. The details of this will be discussed in more detail below.

In one implementation, the generated eValue may be used to control the presentation 220 on the computer system 270 by sorting or by the filtering of certain information which does not achieve a threshold value. In implemented embodiments of the present invention, the eValue is expressed as a single scalar value in a range of −1 to +1, wherein −1 represents the least desirable information and +1 represents the most desirable information. In one implementation, the collection or articles may be presented to the user, ordered by category if the collection was from multiple sources, and then by eValue. In yet another implementation, the evaluation value alone may be used to present the information. In order to adjust the evaluation value for future sessions, the user may selectively read any number of articles, marking each article with one of three values:

"interesting" (+1);
"neutral" (0); and
"boring" (−1).

When the user has finished reading all the articles contained within a story list viewer or story viewer 270, the information evaluator 110 examines results of that session comparing an estimated eValue generated by evaluator 110 to a user's actual rating of the article. It then may adjust its internal structure or user profile to learn from the discrepancies, be more accurate in the next session. Articles that were not read are considered "boring" according to user feedback although other implementations such as a "neutral" value may be assigned. Articles marked "neutral" are skipped during this phase. Upon the end of the session, the surrogate may be discarded and the session is then complete.

Figure 3:
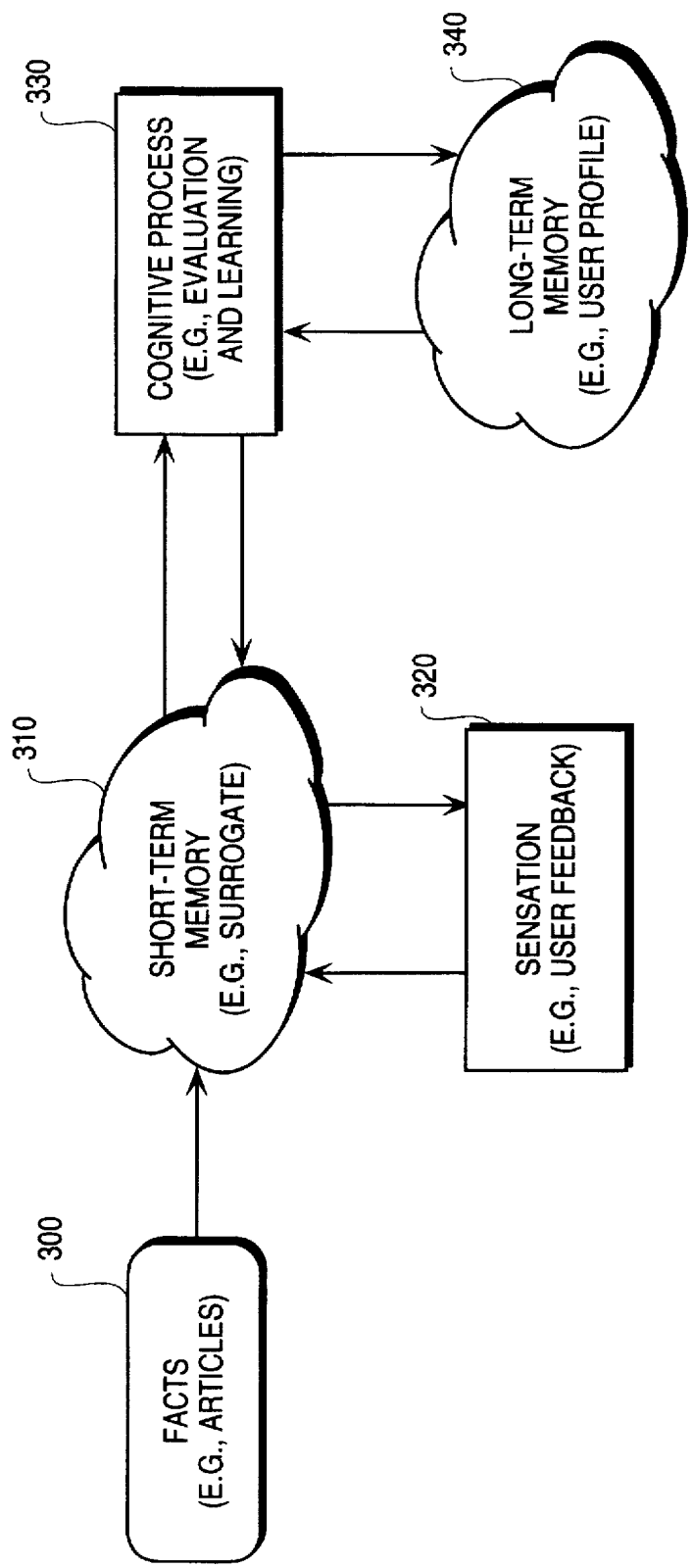
FIG. 3 illustrates a block diagram of the mechanics by which the evaluation of information in implemented embodiments of the present invention may be implemented.

Agents, recognizers and the surrogate operate as shown in FIG. 3. This process is performed in implemented embodiments in a computer system although dedicated apparatus may also be used. Facts 300 are input into a short-term memory, known as the surrogate 310, wherein certain information is extracted from the article for further processing. User feedback 320 is provided which is stored in the short-term memory to select that information which is most relevant. A cognitive process 330 evaluates and learns from the user feedback so that information which is of interest can be recalled, and used later for additional information processing. This evaluation learning process may be stored in a longterm memory 340, such as the user profile 160 in a non-volatile storage medium shown in FIG. 1. This allows recollection of user interests, and processing of information in the future according to previously-identified user interests.

Figure 4:
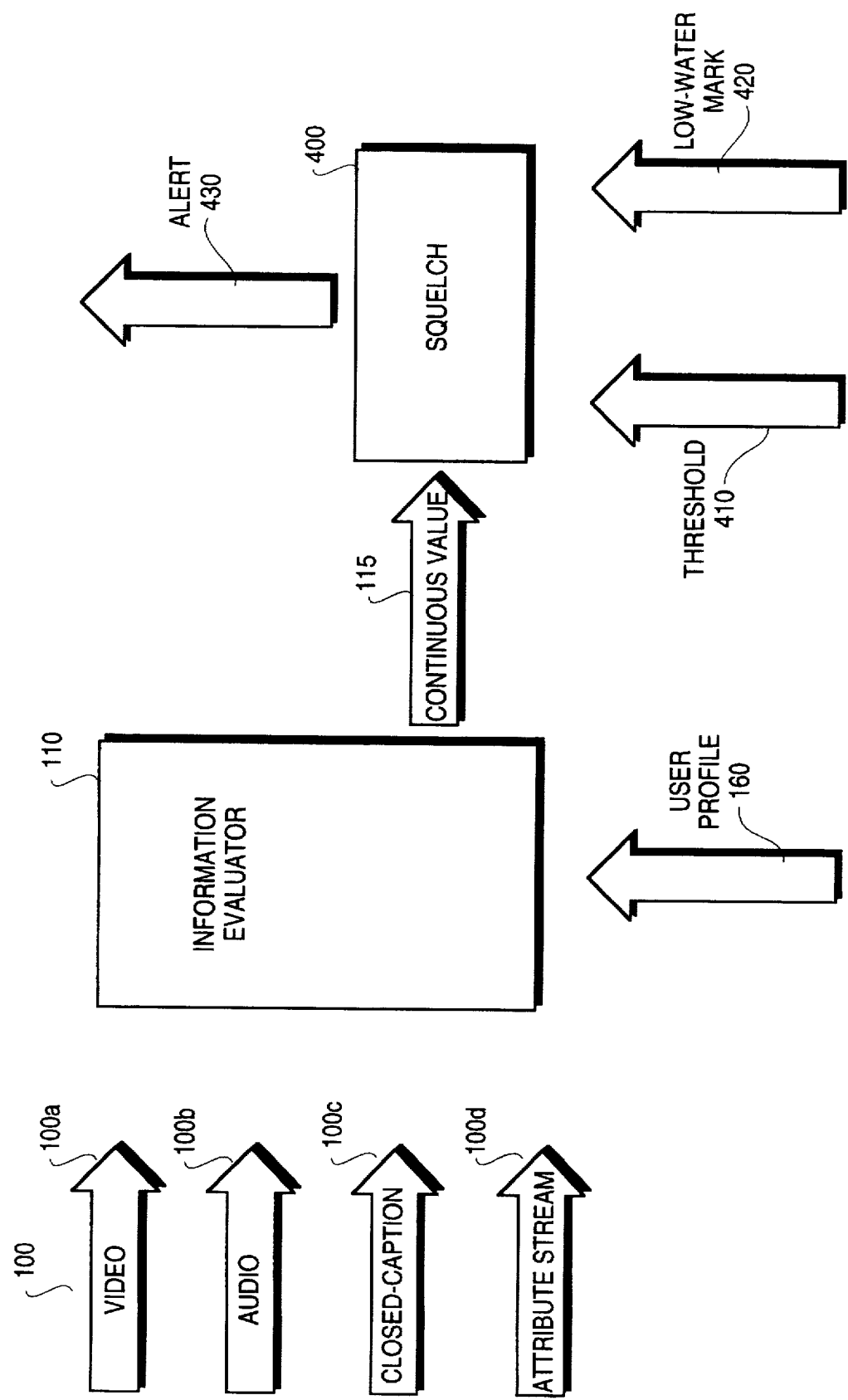
FIG. 4 shows a more detailed view of one type of information evaluation, and an application in which such information evaluation which may be performed.

In yet another implementation, a squelch control 400 may be fed by the continuous evaluation value 115 which is received from the evaluation process 110. In this, or any other implementation, a plurality of sources 100a–100d may be used, such as video information 100a, including identifying information, if any, audio information 100b, closed-caption programming 100c, or any attributes 100d about any of the above-information, or any other input information. Identifying information may include, but not be limited to, sources, subjects, dates, or other features about an information source. The user profile 160 again feeds the evaluation process 110 which then generates the continuous evaluation value 115. This eValue 115 may be used by the squelch control process 400 for the processing of the information. Again, the squelch control 400 may use, as input parameters, a threshold value 410 which indicates a value which certain information should not exceed in order for it to be considered, and a low-water mark value 420 which may operate as a threshold relevance value for processing of additional information. In this instance, and alert value 430 may be generated which indicates to the user that certain information is of interest, or may be used as a signal to control automated recording equipment (e.g. a video cassette recorder [VCR]), to commence a recording operation. For example, in this implementation shown in FIG. 4, such a structure may be used for the control of an automated VCR, wherein certain information of interest may be extracted from a video, audio, or closed-captioned stream. That information which is not of interest is squelched by squelch control 400, and that information which is of interest is recorded.

Figure 5:
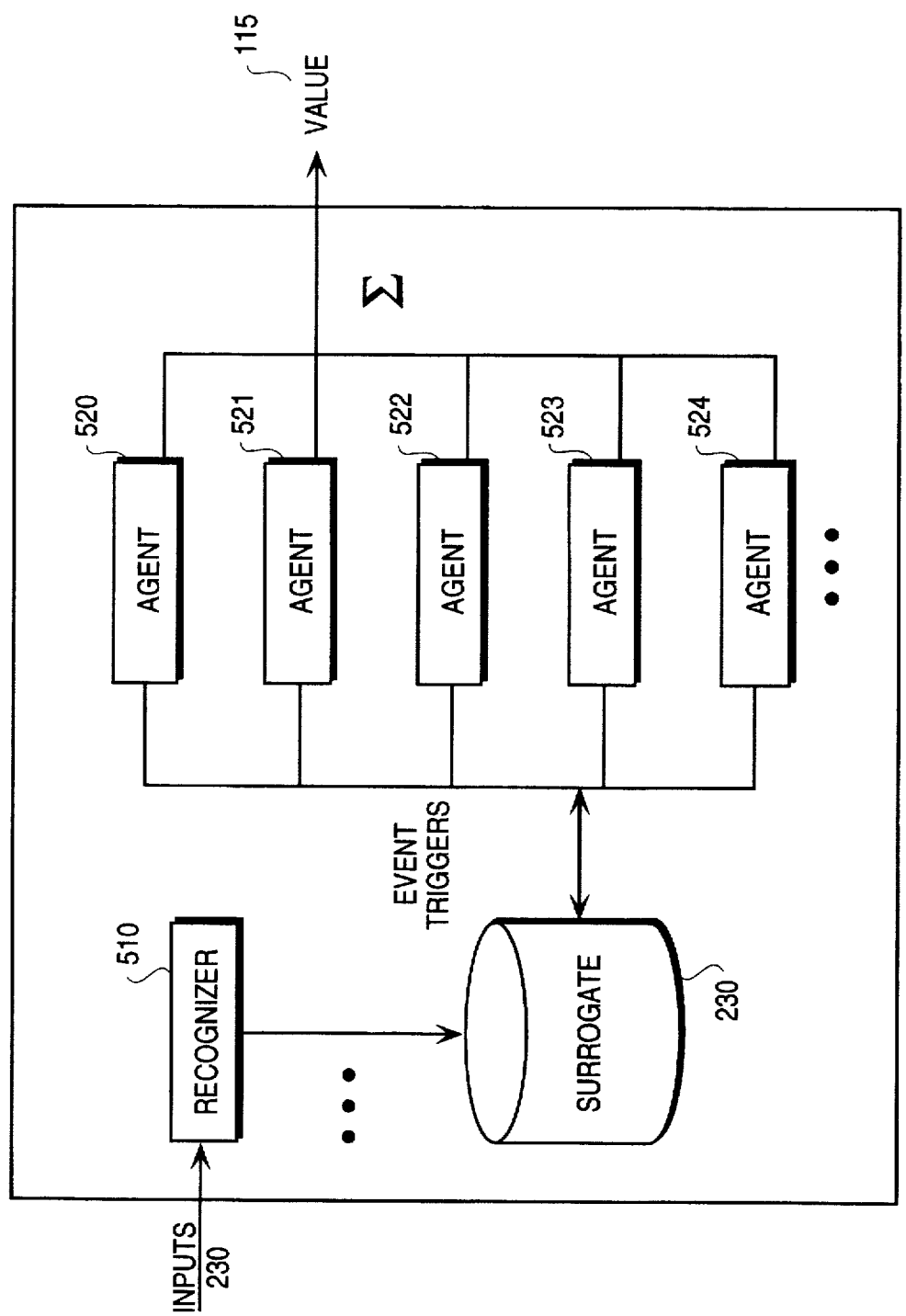
FIG. 5 shows a block diagram of certain recognizers and agents which are used in certain embodiments of the present invention.

The eValue may be generated from a plurality of agents 520–524 as illustrated in FIG. 5 which each respond to certain recognized information in the surrogate 160 as fed by a recognizer 510. For example, the recognizers may include, but not be limited to, any features which are defined for corresponding agents. Each of the agents 520–524 may have a corresponding value associated with is which is tallied and used to generate the evaluation value. The evaluation value may also be generated via a mean or a median of the plurality of agents, according to implementation.

Figure 6:
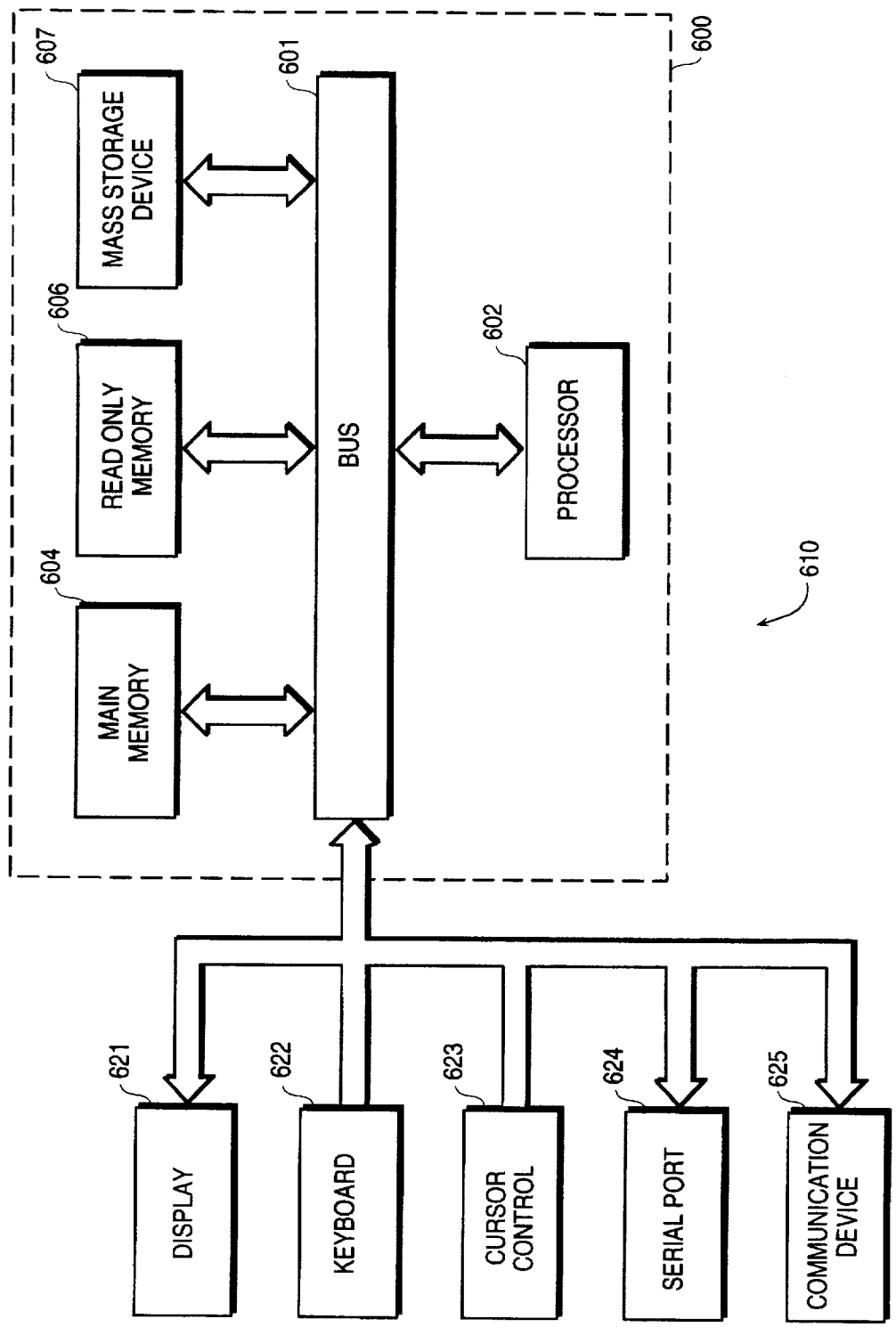
FIG. 6 shows a system in which embodiments of the present invention may be implemented.

Referring to FIG. 6, a system 610 upon which one embodiment of a computer system implementing the features of the information evaluation 110 is shown. 610 comprises a bus or other communication means 601 for communicating information, and a processing means 602 coupled with bus 601 for processing information. System 610 further comprises a random access memory (RAM) or other volatile storage device 604 (referred to as main memory), coupled to bus 601 for storing information and instructions to be executed by processor 602. Main memory 604 also may be used for storing temporary variables or other intermediate information during execution of instructions by processor 602. System 610 also comprises a read only memory (ROM) and/or other static storage device 606 coupled to bus 601 for storing static information and instructions for processor 602, and a data storage device 607 such as a magnetic disk or optical disk and its corresponding disk drive. Data storage device 607 is coupled to bus 601 for storing information and instructions.

System 610 may further be coupled to a display device 621, such as a cathode ray tube (CRT) or liquid crystal display (LCD) coupled to bus 601 for displaying information to a computer user. An alphanumeric input device 622, including alphanumeric and other keys, may also be coupled to bus 601 for communicating information and command selections to processor 602. An additional user input device is cursor control 623, such as a mouse, a trackball, stylus, or cursor direction keys, coupled to bus 601 for communicating direction information and command selections to processor 602, and for controlling cursor movement on display 621.

In implemented embodiments, other devices which may be coupled to bus 601 include a serial interface 624 and/or a communication device 625 either of which comprise means for communicating with other devices. This communication device may also include a means for communicating with other nodes in a network. In some embodiments, this may include an Ethernet standard interface coupled to a CSMA/CD backplane for communicating information with other computers for receiving and/or transmitting information (e.g. raw or processed information). Note, also, that any or all of the components of system 610 and associated hardware may be used in various embodiments, however, it can be appreciated that any configuration of the system that includes a processor 602 may be used for various purposes according to the particular implementation.

In one embodiment, system 610 is one of the IBM AT-compatible type personal computers such as the Gateway 2000 brand personal computer manufactured by Gateway Computer Systems. Processor 602 may be one of the Pentium® brand microprocessors available from Intel Corporation of Santa Clara, Calif. (Pentium and Intel are trademarks of Intel Corporation).

Note that the following discussion of various embodiments discussed herein will refer specifically to a series of routines which are generated in a high-level programming language (e.g., the C or C++ language) and compiled, linked, and then run as object code in system 610 during run-time. It can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Figure 7:
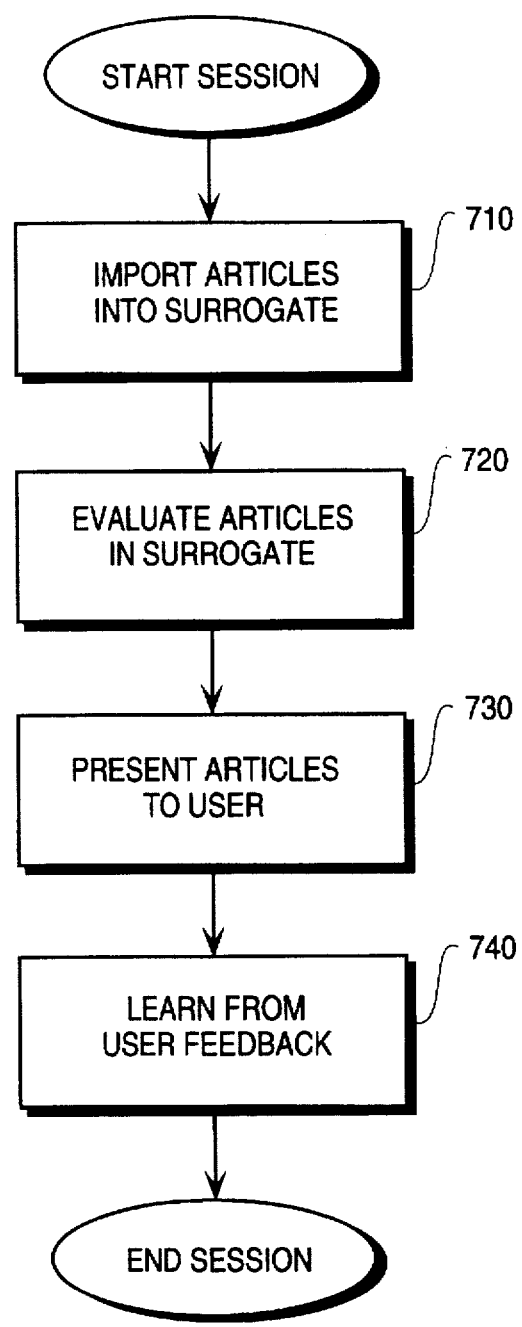
FIG. 7 shows a process flow diagram of a typical information evaluation session.

As is shown in FIG. 7, information evaluation, whether implemented as a process or apparatus, contains four major components:

Importation of articles into surrogate 710;
Evaluation of articles in the surrogate 720;
Presentation of articles to the user 730; and
Learning from user feedback 740.

Figure 8:
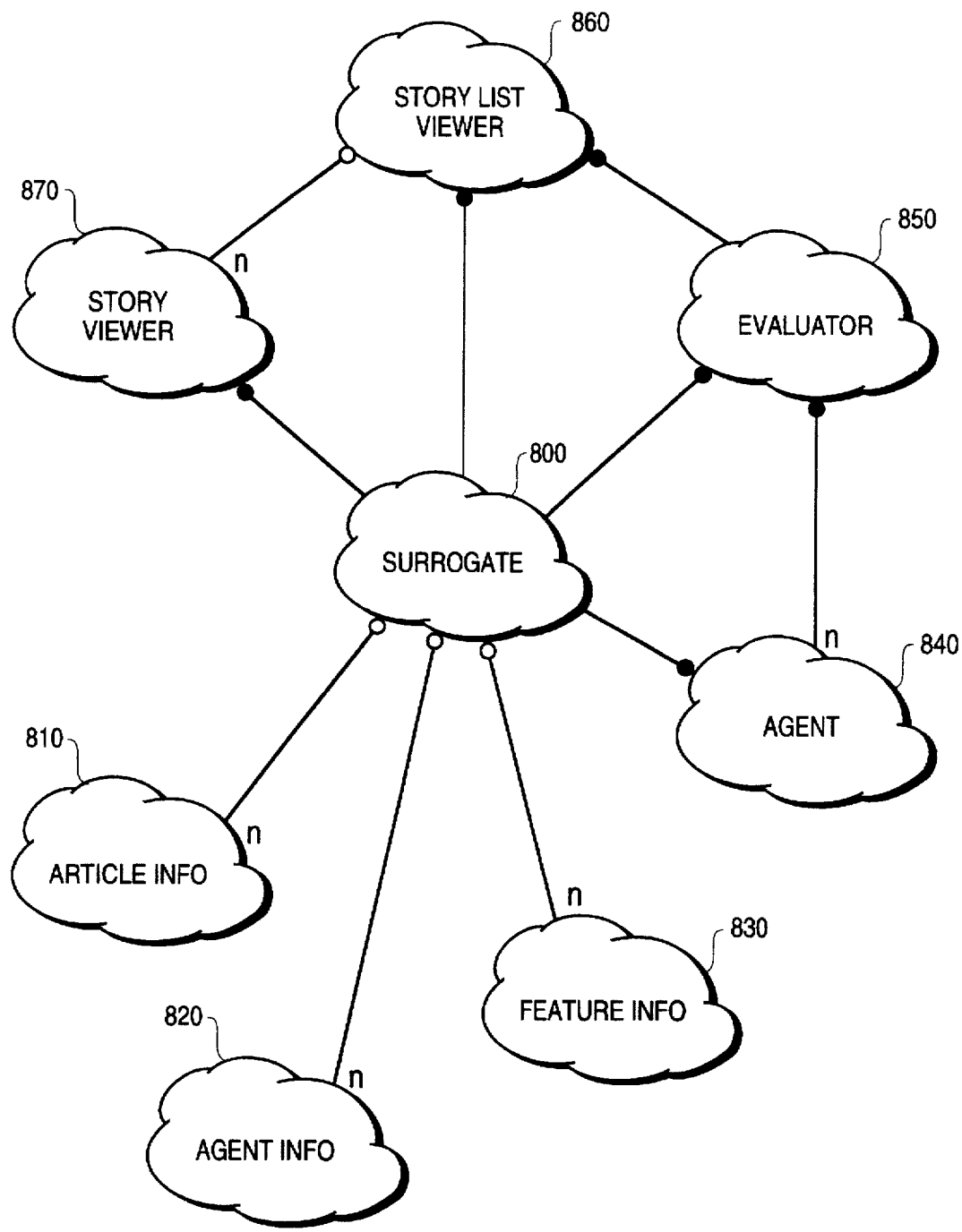
FIG. 8 shows a class architecture of objects which are maintained in implemented embodiments of the present invention.

As illustrated in FIG. 8, the class architecture, in Booch notation, of the one implementation of the information evaluator, including the surrogate, is illustrated. These classes are used for storing, during an evaluation session, in memory of the system, the characteristics of information. In the figure, a darkened circle indicates the user of another class for its internal implementation, and an open circle indicates the use of another class for the interface it makes available to other classes (Booch notation). For example, the surrogate 800 includes several pieces of information, including article information 810, for each of the plurality of articles contained in the raw information 100. This may include, but not be limited to, any subject areas in which the information is contained (e.g., sources), headings (e.g., titles, or other information), authors of the information, dates of the information, etc. This article information may also by used as features shown as 830 in FIG. 8. The agent information 820 is information regarding the specific agents 840 which are shown in FIG. 8. Agent information 820 will be discussed in more detail below.

The surrogate also contains feature information 830, to allow the mapping of given identified features to given agents. In short, the surrogate contains mappings of indices mapping articles to features, features to agents, and agents to articles. This short-term memory, or surrogate, is maintained for the duration of the session, and portions of it may be stored (such as the agent information), in the user profile for additional processing. The evaluator 850 references the surrogate class 800 and the agent objects themselves 840. The story list viewer 860 references the evaluator class 850, to control the evaluation and learning process, and also references the surrogate class 800 for referencing eValues and recording user feedback. The story viewer 870 may be used by the story list viewer itself in order to display given stories from the story list. Of course, any or all of these objects may be used, according to implementation.

Figure 9:
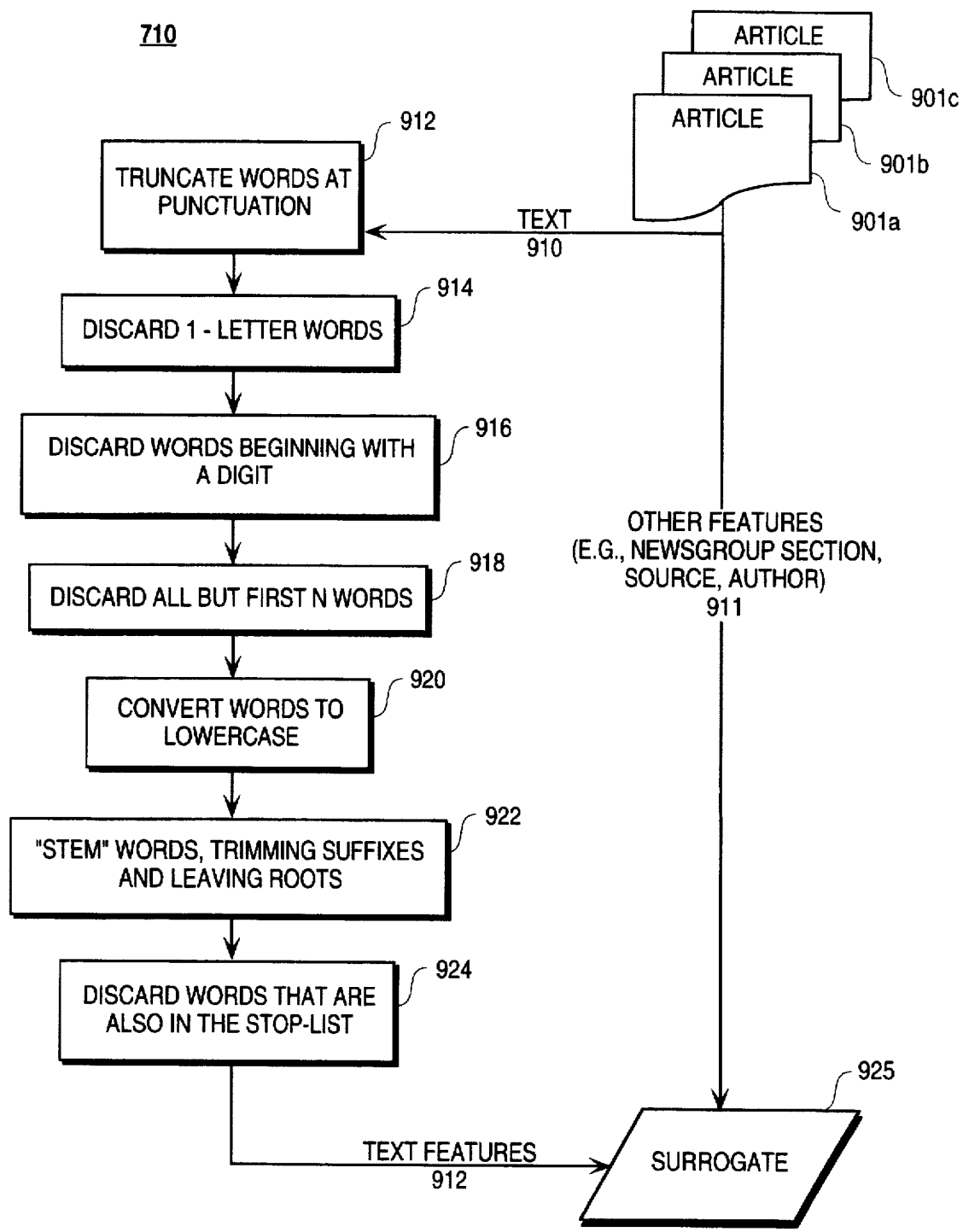
FIG. 9 shows a flow diagram of the importing of articles into a surrogate in implemented embodiments of the present invention.

The creation of the surrogate is shown in more detail in FIG. 9. In implemented embodiments of the present invention, the articles 901a–901c are assembled into a database which parses the information from the separate article file, dates, text, etc., or other information from the articles. Any format of the information may be accepted in various implementations, such as one large file wherein portions of the file are parsed-out in for further processing or filtering. The text 910 from each of the articles may be fed into a separate process which filters out certain information regarding the text. Other features 911 of the article may be fed directly into the surrogate 925 for storage. For example, these features may include the USENet newsgroup in which the article appeared, section of the newsgroup (e.g., thread), source of the article (e.g., the internet host), or any author information such as the individual who authored the article. Since these features do not require additional processing, they may be fed directly into the surrogate for creation of feature information and, perhaps, agents if required. The text 910 is further processed, however.

The surrogate can be viewed as a composite view of the entire story collection wherein all articles are indexed by their features. Features may include the words contained within the articles or other characteristics of the information, such as categories, newsgroups, sources, dates, etc. The text is further processed wherein certain pre-identified punctuation is stripped from the text 910 as illustrated at step 912 of FIG. 9. The specific punctuation characters which are removed may be stored in a configuration file according to implementation. At step 914, one-letter words from the processed text stream may also be removed, less any defined exceptions (e.g. "X") which may be stored in a separate file which is configured by the user or programmer. At step 916, words beginning with a digit may also be removed, since they typically are numeric values, or may be symbols which are usually not useful for filtering any type of interesting information. This is also subject to an exception list (e.g. "3M" or "76ers") which are defined by the user or programmer, according to implementation.

At step 918, all but the first N words of the articles may be discarded, because in certain implementations the subject matter of an article may be determined from a subset of the article. This is also an optimization step, and in other implementations, the entire article may be used. In implemented embodiments of the present invention, $25 \leq N \leq 50$ wherein the first 25–50 words of each article are used for creation of the surrogate. To further process the text stream, all words are converted to lower case at step 920. This allows case-insensitive scanning of the article to be performed. Again, this is only in one implementation, and other implementations may be case-sensitive according to design choice. Next, stem words only are used at step 922 wherein suffixes and other conjugations of words may be stripped. This leaves roots of words so that singulars and plurals of given identified words are not treated as separate words. This process may also include stripping of duplicate words contained within the processed text stream. Finally, at step 924, words that are in a stop-list may also be removed from the surrogate. These may include words which do not indicate the particular relevance of any article. These may include pronouns, articles, and other words which will not indicate any relevance of a particular article to a user.

The processed text features 912 are then input along with the other features of the articles 911 into the surrogate 925 for additional processing. This additional processing will now be discussed. Upon the conclusion of the steps shown in FIG. 9, the surrogate contains a feature map which is an index of all the features, the processed text, and the other information about the article, arranged into index form. Then, each of these features may be used to refer to each of the articles having the specified feature(s).

Figure 10A:
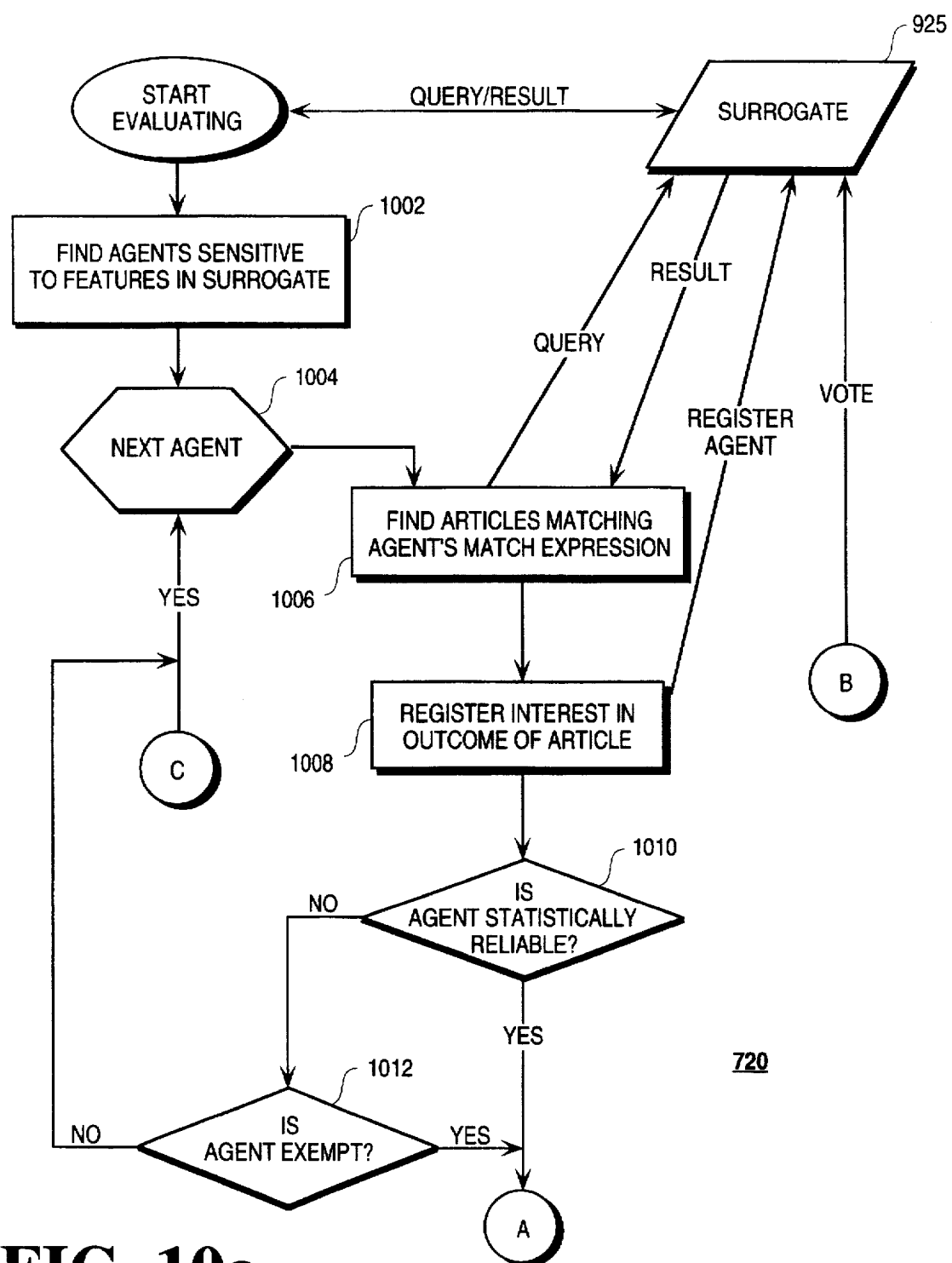
FIGS. 10a and 10b show a process which is used for evaluating articles contained within the surrogate.
Figure 10B:
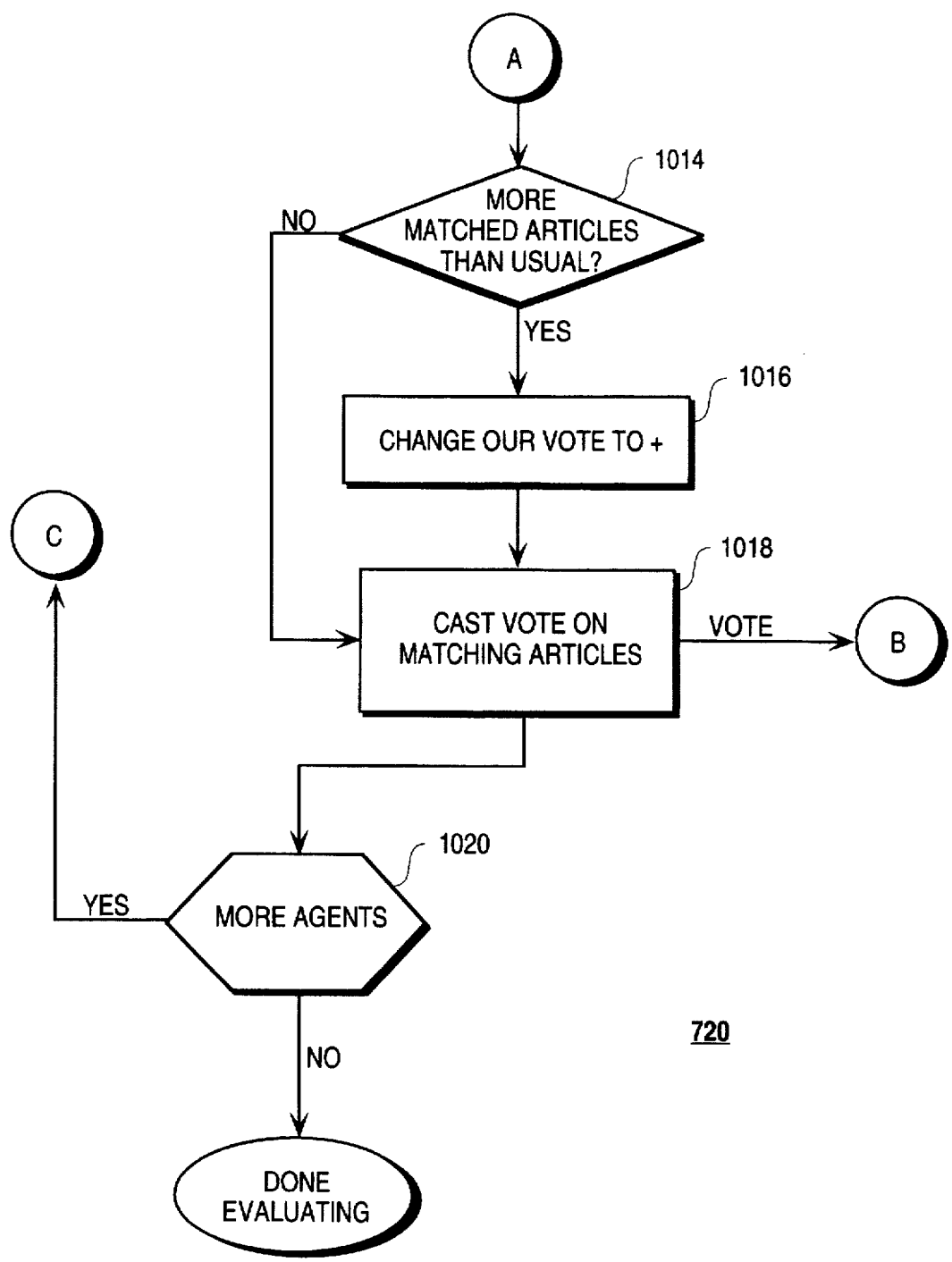

FIGS. 10a and 10b show more details of the process 720 which is used for evaluating articles contained within the surrogate. As previously discussed, the evaluation of articles creates a value rating, known as an eValue, for each of the articles. The eValue represents the information evaluator's prediction of how desirable this story is to the user. As previously discussed, this value may be used to:

1. control the sorting and/or filtering of articles to the user in a story viewer or a story list viewer application program;

2. control the automatic recording of articles to tape, disk, or other mechanism. This application is particularly useful if the articles are part of a real-time linear, real-time stream such as a newswire source, or a non-textual form, such as audio or video information; or 3. to control the re-transmission of articles via electronic mail, fax, or other communications mechanism, either to the user or other destination (such as a second user). This application is particularly useful for remote access, group knowledge sharing, or urgent alerts via a remote pager.

Figure 11:
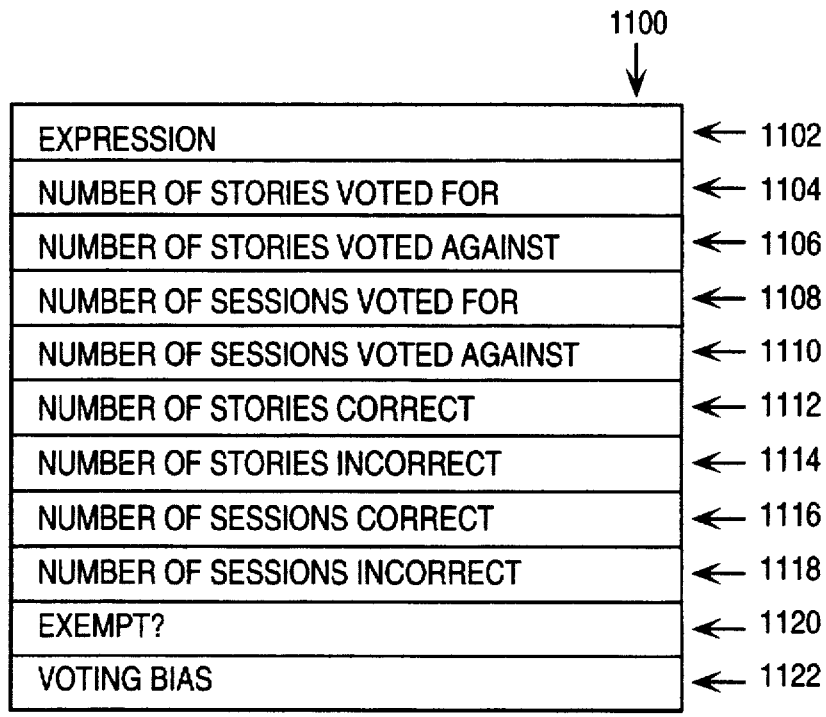
FIG. 11 shows an example data structure which may be used for each agent in implemented embodiments of the present invention.

An implementation of a data structure containing an agent is shown as 1100 in FIG. 11. The actual data structure used for maintaining each agent varies according to design choice, however, certain information is contained, in this implementation, within a record associated with the agent in order for certain features provided by certain implemented embodiments of the present invention to be available. This is stored in memory during system run-time and in non-volatile storage (e.g. disk) between sessions. These will become apparent as the process 720 in FIGS. 10a and 10b is described in more detail.

Upon completion of processing the raw input information to construct a surrogate at step 710 shown in FIG. 7, process 720 is performed upon the surrogate in order to determine those agents in the user profile which are sensitive to any features contained within the surrogate 925. As shown in FIG. 11, each agent has associated with it a field 1102, an expression which is a string, in the case of text information, (or any other feature for the type of information, according to implementation) that must be matched in the surrogate in order for the agent to match to the article contained within the surrogate. The expression contained in field 1102 may be a Boolean expression in order to determine a match with a string or combination of strings in an article contained within the surrogate. At step 1002 in FIG. 10a, all agents within the surrogate having matching expressions are determined. Then, in loops 1004–1020 in FIGS. 10a and 10b, all agents matching features in the surrogate are processed. As previously discussed, any agents having expressions matching the features contained within the expression in the agent in the surrogate are referenced by a pointer or other similar means at step 1006. Then, at step 1008, the interest of each agent, whether it be interested (e.g., according to the presence of the feature) or is not interested at step 1008. It is then determined at step 1010 whether the agent is statistically reliable. Statistic reliability is determined, in this embodiment, based upon whether the agent has previously voted correctly within a standard deviation of the average number of correct votes for all agents. For example, if the agent's ratio of correct (those which agreed with the user) to incorrect (those which didn't agree with the user) previous votes is at least as good as the average number of correct votes for all of the agents minus one standard deviation, then the agent will be allowed to vote and thereby used to determine the final eValue for the article. This is determined by:

x≧(overall average−(1*standard_deviation))

wherein overall_average is the average number of correct votes for all of the agents in the evaluator.

If the agent is not statistically reliable as detected at step 1010, but the user has somehow indicated that the agent is exempt from the statistical reliability test (e.g., the agent's feature is of particular significance to the user, notwithstanding any reliability measures of its accuracy), then the agent will still be allowed to vote. If the statistically-unreliable agent is not exempt, then it is not allowed to vote, and the process continues to retrieve the next agent at step 1004. Determining whether the agent is exempt or not is user or programmer-settable, and may be stored in a field associated with the agent (e.g., field 1120 of FIG. 11).

Once it is determined whether the agent is exempt and/or whether the agent is statistically reliable at steps 1010 and 1012, then it is determined at step 1014 of FIG. 10b whether more articles contain the agent's match expression than usual (e.g. via some average measure for the agent). If not, then step 1016 is skipped, and step 1018 is proceeded directly towards wherein the vote, whether for or against the article is then cast at step 1018, and is used to calculate the final eValue. In a typical case, the voting bias field 1122 for the agent shown in FIG. 11 is used to determine whether the vote will be for or against the article. This field is set during an initial learning phase, and can be modified over time by user interaction as will be discussed below. If more articles have been matched than usual (e.g., via a mean or median average amount plus a standard deviation) then the agent's vote is set to + for the article at step 1016, and at step 1018 the positive vote is cast. This is to allow a transient increase in information to be detected. For example, if the user typically is not interested in the feature, then the agent has a negative voting bias (e.g., stored in field 1122 of FIG. 11). If the bias is negative then a transient increase in the number of occurrences of the feature from usual will cause a positive vote to be cast for the agent, resulting in an increased eValue. After completion of step 1018, it is detected at step 1020 whether there are more agents present or not. If so, then the next agent is retrieved at step 1004 on FIG. 10a.

If there are no more agents to be processed as detected at step 1020, then the evaluation process is complete. Upon completion of the process, the scalar eValue for each article based upon the votes in the surrogate 925 is then determined using the following expression:

eValue=(nrVotingFor−nrVotingAgainst)/(nrVotingFor+nrVotingAgainst) Thus, the eValue is the ratio of the difference between those agents voting for and those voting against, divided by the total number of agents voting in the current session. This eValue may then be used, according to implementation, as discussed above, to control automated recording equipment, sorting of information by eValue, or the filtering of uninteresting information, for example.

Figure 12:
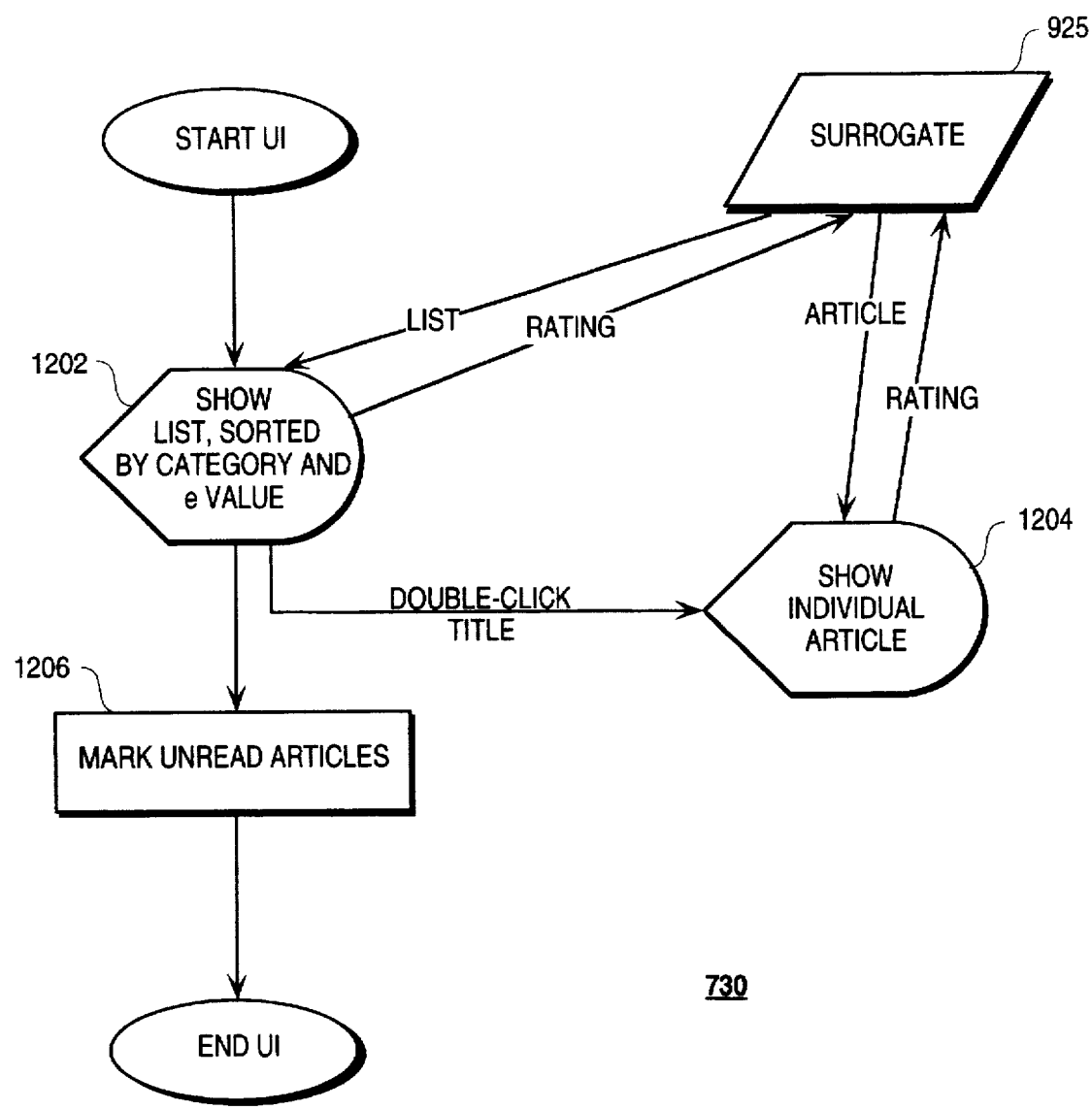
FIG. 12 shows a process for the display of information, such as an article, wherein the user may provide feedback regarding the interest in that article.

One example of a user presentation process is shown in FIG. 12. This process may be used for providing user feedback in order to update status of agents in the user profile. This makes the accuracy of the agents increase over time from session to session. Although user presentation is not required for implementing all embodiments of the present invention, such user interaction does increase the accuracy of the information evaluation process over time.

FIG. 12 illustrates a process 730 which may be used for presenting the article sorted by eValue, and updating various statistics about each article, and thus each agent which voted upon the article. In one implementation, a display screen such as 1300 as shown in FIG. 13 may be used for providing a story list of the articles, sorted by eValue. This allows user feedback to be efficiently and easily performed. Other view applications may use additional viewing windows to allow the user to access the evaluator to make manual adjustments to each agent, or find out why the evaluator arrived at a particular eValue.

In this implementation, the user may respond with a user rating, and confirm or adjust the eValue arrived at by the agents. This enables learning by each of the agents. In this example, at step 1202 of FIG. 12, a list sorted by category and eValue for each separate article which is obtained may first be displayed, as is shown in 1300 of FIG. 13. In this instance, several fields are displayed such as 1302–1306, and 1310 which each may be considered features of each article. In this example, 1302 is a date field, 1304 is the time field, 1306 is the category field, and 1310 is the title of the article field. 1312 may be a key such as a reference to a particular file contained within a file system or database. 1307 displays the eValue for the article which is scaled and rounded in order to be expressed as an integer from −100 to 100 for ease of presentation and use. Field 1308 displays the number of agents voting on (for or against) the article. 1309 allows the setting of a particular user rating for the article. If a double-click of the title is performed, such as by the selection of one of the items (e.g., 1320 of FIG. 13), then the individual article may be displayed as shown at step 1204 of FIG. 12. If so, this then enables a second process, wherein the user may select and set a user value which is then compared and used to adjust the agents in the user profile.

Figure 14:
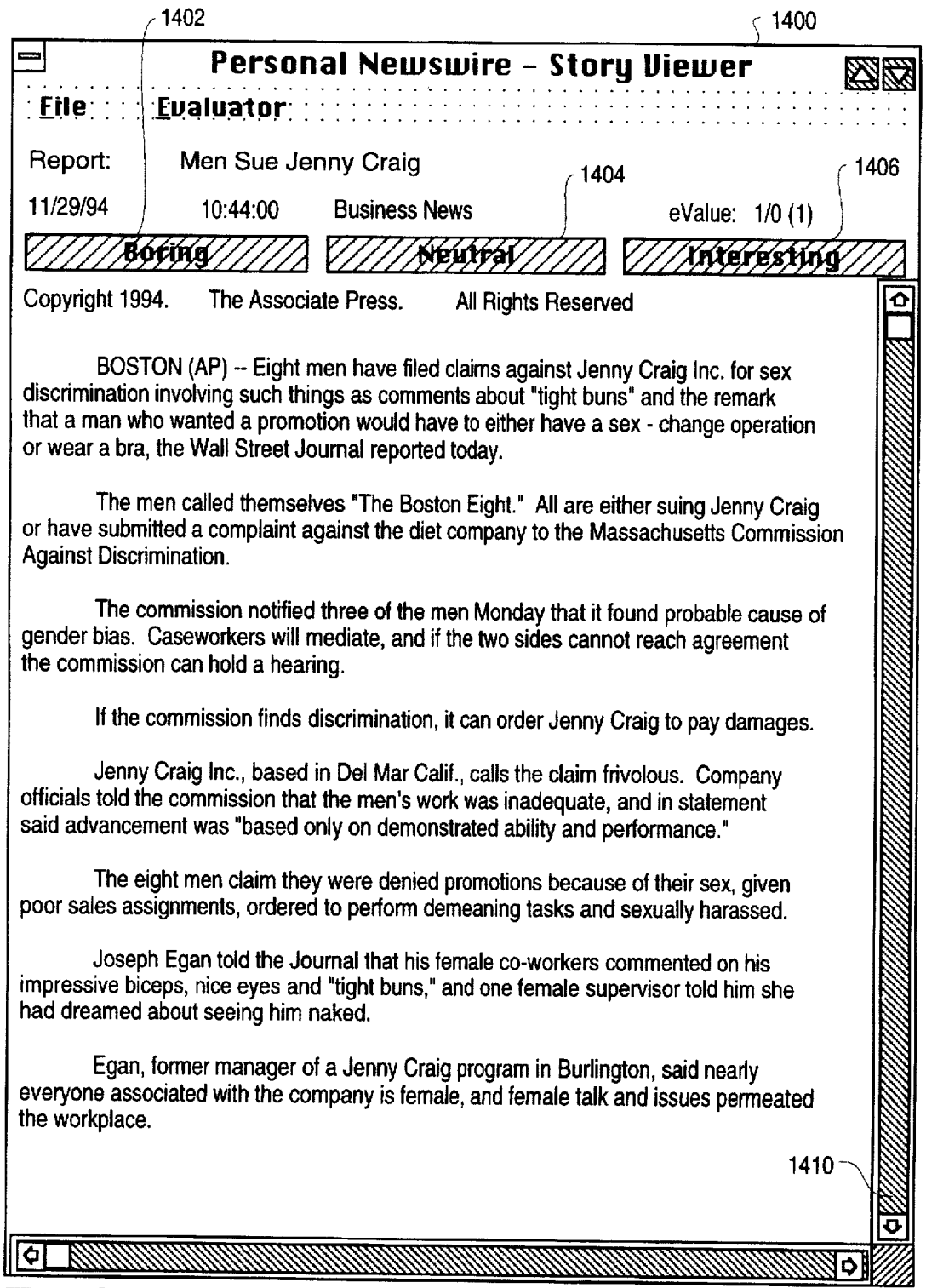
FIG. 14 shows an example of a user interface which may be used for displaying information based upon the calculated evaluation value.

For example, a display such as 1400 of FIG. 14 may be brought up which includes the full text 1410 of the article which has been selected in display 1300. As is shown in FIG. 14, three options are shown to the user. A first option 1402 is for indicating a negative want eValue, or that the article is boring. In contrast, a user may also select an icon 1406 which applies a user value of '1' to the article indicating that it is "interesting." If the user selects the icon 1404, then a user value of '0' or neutral is assigned to the article. The effect of a '0' vote is an ambivalent vote that causes a story to be skipped during the learning phase. A '0' vote is useful when the user either cannot decide how they feel about the article, or they think the story would not be useful for agent training. These values are stored along with the agent in the surrogate for the session, and this is used to update statistics about each feature, and thus each agent.

Any articles which are not selected by the user are then marked as "unread," or assigned a user rating of '−1' at step 1206 in FIG. 12. This is equivalent to selecting icon 1402 in FIG. 14 during the feedback phase. Upon the completion of step 1206 for all unread articles, the user interface process is thus complete, completing step 730 of FIG. 7, and the learning process 740 can now commence. This will be described with reference to FIGS. 15–18 below.

Figure 15:
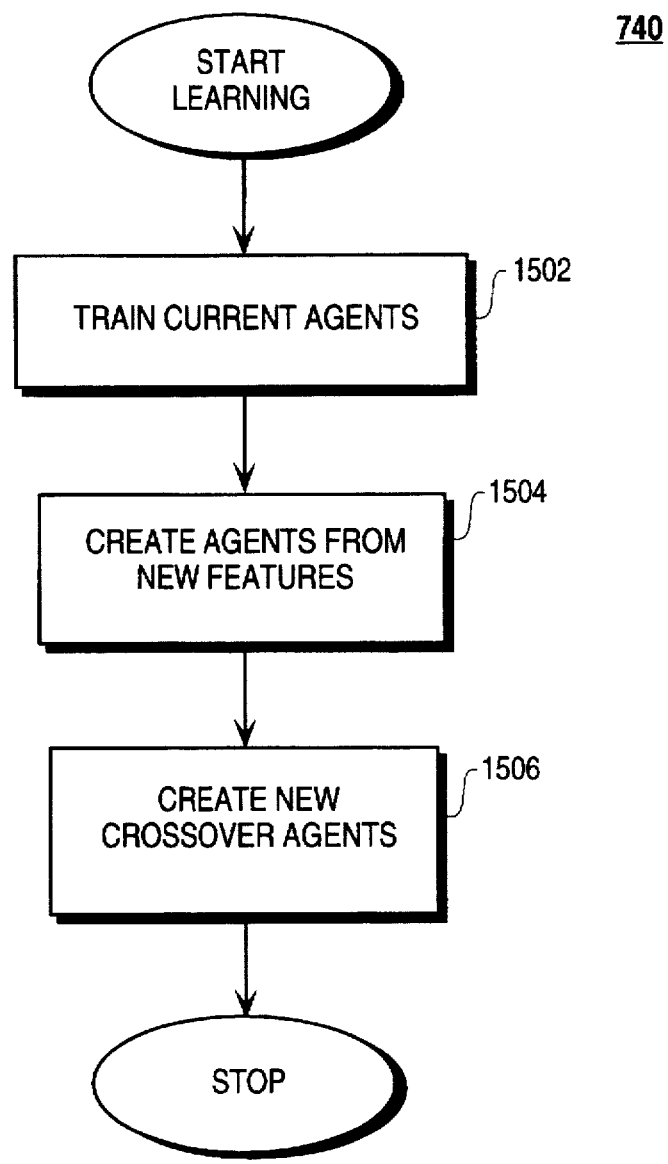
FIG. 15 shows a process flow diagram of an information evaluator post-processing process for updating the agents.

During the evaluation post-processing, or "learning" phase, as is shown in FIG. 15, the information evaluator assimilates the user rating feedback and makes changes to the user profile in order to improve the accuracy of the agents for subsequent sessions. Three major portions of the process are performed:

training current agents which voted upon the current articles 1502;

creating new agents for features without agents, step 1504; and creating new agents by combining elements of existing agents (step 1506).

Figure 16:
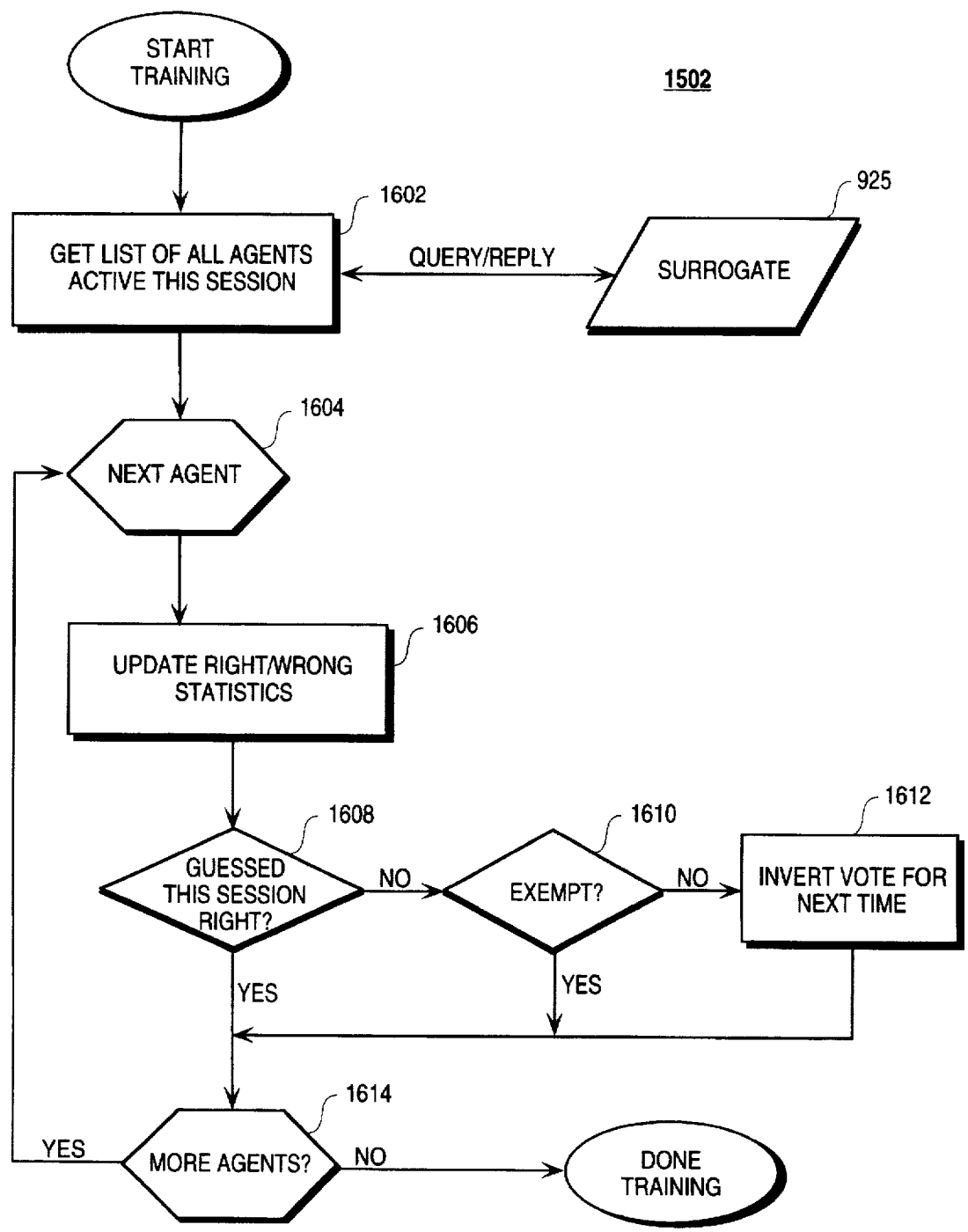
FIG. 16 illustrates a process used for training current agents in the information evaluator system.
Figure 17:
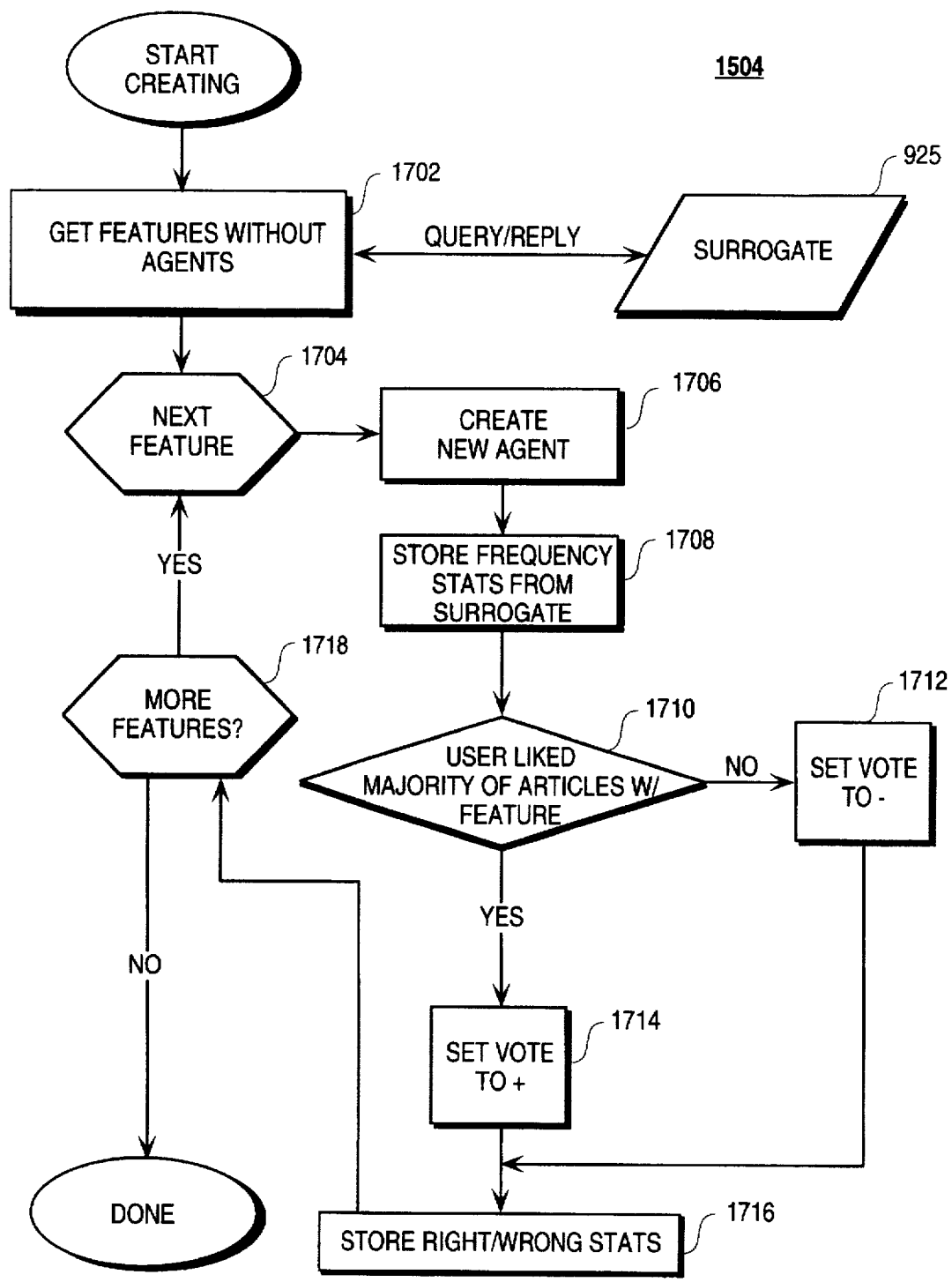
FIG. 17 shows a process for creating new agents from new features which are detected in information.
Figure 18:
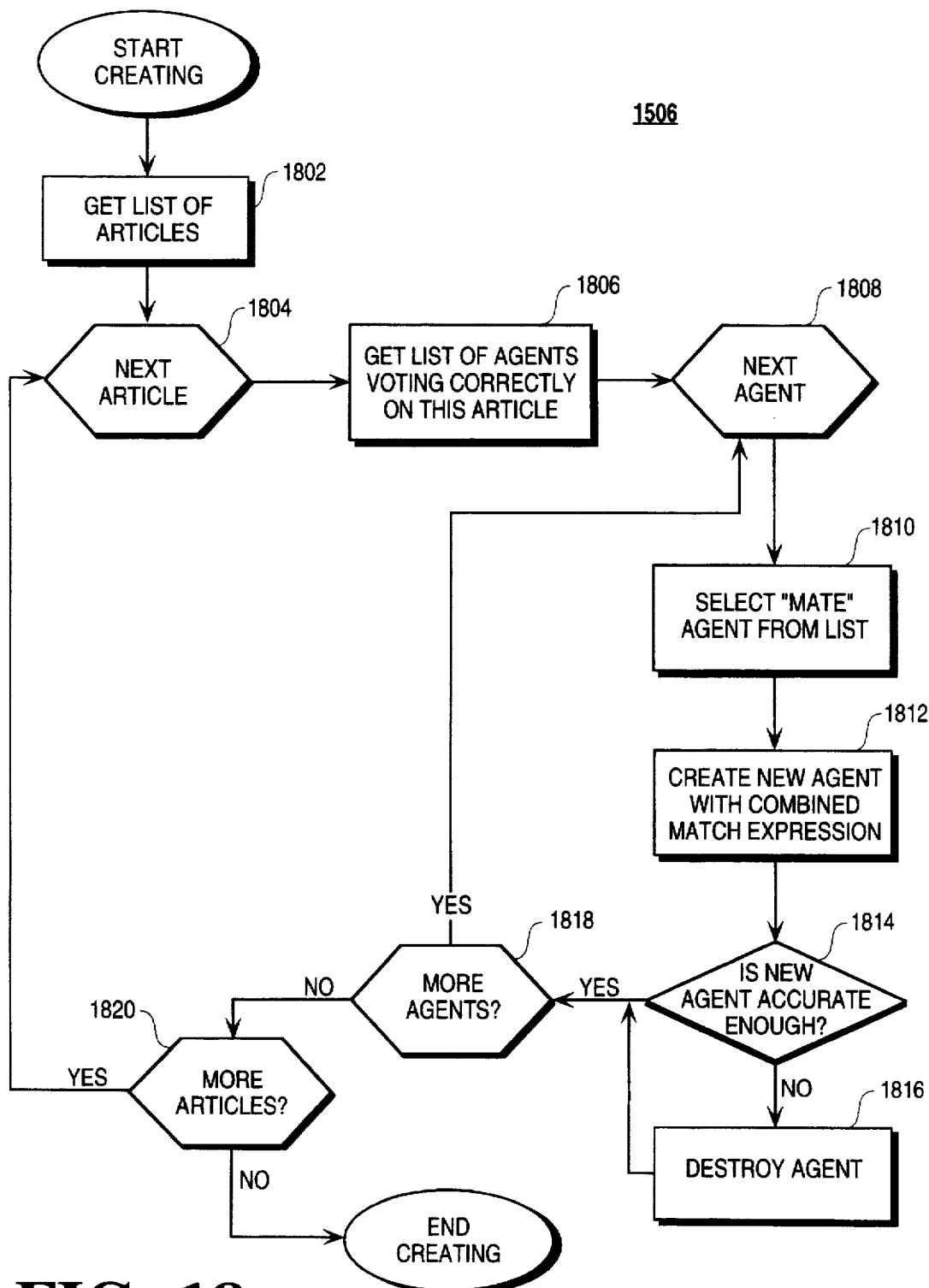
FIG. 18 shows a process for creating new cross-over agents which are combined from a plurality of agents which have obtained special relevance in previous sessions.

The details of each of these three main components of process 840 are shown in more detail in FIGS. 16–18.

FIG. 16 illustrates the initial training of the agents which occurs after user feedback has been obtained (e.g., the completion of the process 730 in FIG. 12). In process 1502 of FIG. 16, agents compare the user ratings of the articles they match to how they voted. These statistics are stored in memory (and in non-volatile memory, such as a fixed media device, between evaluation sessions) in the various fields shown in datum 1100 of FIG. 11. For example, at step 1602, a list of all the agents which have participated in the current session are obtained from the surrogate 925. Then, loop 1604–1614 is performed until all agents which were active in the current session have been processed. At step 1606, the right and wrong statistics are updated. Thus, fields 1106–1118 in FIG. 11 are all updated. This is to allow training of the agent for subsequent sessions. The tally of articles guessed right (user agreed with the eValue, whether + or −) and wrong (user disagreed) are remembered and used to compute the voting accuracy of the agent. These statistics are kept in fields 1116 and 1118. Further, the number of stories voted correctly and the number of stories voted incorrectly are maintained in fields 1112 and 1114. Raw statistics for the number of stories and the number of sessions voted for and against are kept in fields 1104–1110. If, the agent voted right in the current session as detected at step 1608, then no further processing of the agent needs to be performed, and thus the processing of the agent is complete at step 1614. The process may then continue if there are remaining agents, and retrieve the next agent at step 1604. If not, then training is complete.

If the agent did not vote in the current session correctly, as detected at step 1608, then at step 1610, it is determined whether the agent is exempt or not. Again, this is a user-settable value, according to field 1120 of FIG. 11, and may indicate whether the agent is allowed to vote in subsequent sessions, whether statistics indicate that the agent is reliable or not. That is, the user may override the agent's statistical measurement. Finally, the vote for the agent is inverted at step 1612, if the session was not guessed correctly. That is, if the agent did not get more correct votes than incorrect votes, then the vote is caused to be inverted for the next session at step 1612. This is done at step 1612 by adjusting the vote bias flag 1122 at step 1612 to the opposite of the vote for the current session. Then, after the completion of step 1612, loop 1604–1614 is thus complete. This is done for all agents which were active in the current session, and the process is then complete upon the termination of processing of each active agent.

FIG. 17 illustrates the details of the creation of a new agent from new features. After training the agents that match the articles in the session, new agents need to be created for any features that did not match any of the existing agents for the current surrogate. In summary, agents are created as if they existed and voted correctly during the current session. This process is very useful at early stages of information evaluation, that is, the first few sessions of information evaluation. This allows the user to provide positive feedback, and thus create agents which can then be used later to automatically obtain information which is of interest to a user. First, at step 1702, the features that did not have agents voting upon them are obtained from the surrogate 925. The features are then processed in the loop 1704–1718 as illustrated in FIG. 17. First, a new agent is created for the feature at step 1706. Frequency statistics such as voting correctly/incorrectly, and voting for articles, are then stored from the surrogate at step 1708. Then, an initial vote is determined. If a majority of the articles with the feature were given a positive feedback by the user value, as detected at step 1710, then the initial vote is set to a 'yes' (positive) vote at step 1714. If not, as detected at step 1710, then the initial vote is set to 'no' (negative). The correct/incorrect statistics, as discussed above with reference to FIG. 11, may then be stored at step 1716. Upon detection that there are no more features which do not have agents, as detected at step 1718, the process is thus complete.

Finally, FIG. 18 illustrates the process 1506 which is used for creating new, compound or so-called "crossover" agents. These are agents which have voted correctly a number of times, and which may be paired into groups of two or more by Boolean expressions. In implemented embodiments of the present invention "AND" expressions are used, however, in more advanced techniques, combinations of AND/OR's using prior art logic expressions such as those used for reduction and truth tables may be used. Thus, process 1506 is shown for illustration purposes only, and compound agents may be created by using other types of Boolean reduction rules as are common in the prior art. At step 1802 the list of articles is obtained. All articles in the surrogate are processed in loop 1804–1820. The list of agents voting correctly on the article is obtained at step 1806. Again, because agents are indexed by article, and vice versa, this may be easily performed. Then, at step 1808, the next agent for the article is obtained. Steps 1808–1818 are performed upon all agents who voted correctly on the current article. Any other agents which voted correctly on the article are selected at step 1810 so that they may be grouped together. Thus, many agents may be combined according to whether the statistics should allow them to exist for a subsequent session. Upon selection of a mate at step 1810, then a new agent is created at step 1812 with a combined match expression. Then, at step 1814, it is detected whether the statistics for the two agents will make the agent accurate enough for a subsequent session. That is, it is statistically reliable. If not, then the newly created agent is destroyed at step 1816. If so, it is allowed to "live," and the next agent is obtained at step 1818. Loop 1808–1818 continues until there are no more agents which voted correctly on the current article. When step 1818 yields a negative result, and it is detected at step 1820 that there are no more articles present in the surrogate the process is complete.

Using these newly-created agents, additional information evaluation may be performed in the future, wherein the performance of the information evaluation increases, improving the additional processing of the information. The additional processing performed after information evaluation is thus improved, whether it be the filtration, re-transmission of information, or automated control of recording equipment. Of course, the creation of new agents including compound expressions in this manner is not required, and evaluation can be just as effective with many agents having simple expressions being used for evaluation. These processes pose advantages over prior art means, including genetic algorithms and bidding schemes because the method consumes less processing power, and is relatively easy to manage both from an implementation and a user standpoint.

Thus, in conclusion, a method and apparatus for processing information has been described, specifically, with regard to certain agents and the assignment of evaluation values for specific pieces of such information. Although the present invention has been described with reference to certain specific embodiments thereof, the present invention should be construed as limited by the appended claims which follow.

What is claimed is:

1. A method for evaluating any computer-readable articles, the method comprising the computer-implemented steps of:

presenting any such articles to a set of agents for each article within a session, each agent including an expression, a voting bias, and an indication of the statistical reliability of the agent;

determining whether the expression for each agent matches the article;

determining whether the agent is sufficiently reliably to vote when the agent's expression matches the article;

voting for or against the article according to the agent's voting bias, if the agent is sufficiently reliable to vote; and deriving an evaluation value for the article from a count of agents voting for the article and a count of agents voting against the article.

2. The method as claimed in claim 1 further including the step of:

receiving feedback which modifies how future articles should be evaluated.

3. The method as claimed in claim 2 further including the steps of:

updating, based on the feedback, the statistical reliability indication of each agent that was active during the session; and determining, based on the feedback, whether to invert the voting bias of each agent that was active during the session.

4. The method as claimed in claim 2 further including the step of:

creating a new agent for a feature previously not having an agent.

5. The method as claimed in claim 1 wherein said voting bias is represented by a binary value.

6. The method as claimed in claim 1 further including the step of:

filtering out information which does not reach a certain threshold value.

7. The method as claimed in claim 1 further including the step of:

sorting information by accumulating values generated by a set of agents.

8. The method as claimed in claim 1 wherein the indication of statistical reliability of the agent is based on whether the agent had previously voted correctly within a standard deviation of the average number of correct votes for all agents.

9. An apparatus for evaluating articles, the apparatus comprising:

means for presenting any computer-readable articles to a set of agents for each article within a session, each agent including an expression, a voting bias, and an indication of the statistical reliability of the agent;

means for determining whether the expression for each agent matches the article;

means for determining whether the agent is sufficiently reliable to vote when the agent's expression matches the article;

means for voting for or against the article according to the agent's voting bias, if the agent is sufficiently reliable to vote; and means for deriving an evaluation value for the article from a count of agents voting for the article and a count of agents voting against the article.

10. The apparatus as claimed in claim 9 further including:

means for receiving feedback which modifies how future articles should be evaluated.

11. The apparatus as claimed in claim 10 further including:

means for updating, based on the feedback, the statistical reliability indication of each agent that was active during the session; and means for determining, based on the feedback, whether to invert the voting bias of each agent that was active during the session.

12. The apparatus as claimed in claim 10 further including:

means for creating a new agent for a feature previously not having an agent.

13. The apparatus as claimed in claim 9 wherein said voting bias is represented by a binary value.

14. The apparatus as claimed in claim 9 further including:

means for filtering out information which does not reach a certain threshold value.

15. The apparatus as claimed in claim 9 further including:

means for sorting information by the generated value.

16. The apparatus as claimed in claim 9 wherein the indication of statistical reliability of the agent is based on whether the agent had previously voted correctly within a standard deviation of the average number of correct votes for all agents.

* * * * *